(12) United States Patent
Nishikawa

(10) Patent No.: US 11,425,345 B2
(45) Date of Patent: Aug. 23, 2022

(54) IMAGE DISPLAY DEVICE AND PROJECTION OPTICAL SYSTEM

(71) Applicant: Sony Corporation, Tokyo (JP)

(72) Inventor: Jun Nishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/056,332

(22) PCT Filed: Jun. 17, 2019

(86) PCT No.: PCT/JP2019/023830
§ 371 (c)(1),
(2) Date: Nov. 17, 2020

(87) PCT Pub. No.: WO2020/004099
PCT Pub. Date: Jan. 2, 2020

(65) Prior Publication Data
US 2021/0235048 A1    Jul. 29, 2021

(30) Foreign Application Priority Data
Jun. 29, 2018   (JP) .............................. JP2018-123925

(51) Int. Cl.
*H04N 9/31*   (2006.01)
*G02B 3/04*   (2006.01)
(Continued)

(52) U.S. Cl.
CPC ............. *H04N 9/3152* (2013.01); *G02B 3/04* (2013.01); *G03B 21/00* (2013.01); *G03B 21/2066* (2013.01)

(58) Field of Classification Search
CPC .... G03B 21/10; G03B 21/00; G03B 21/2066; G03B 21/28; H04N 9/3152; G02B 13/16; G02B 17/08; G02B 17/0828; G02B 3/04
See application file for complete search history.

(56) References Cited

U.S. PATENT DOCUMENTS 5,477,394 A   12/1995   Shibazaki
5,495,306 A    2/1996   Shibazaki
(Continued)

FOREIGN PATENT DOCUMENTS

CN   102012533 A    4/2011
EP    2302436 A1    3/2011
(Continued)

OTHER PUBLICATIONS

International Search Report dated Jul. 16, 2019 in PCT/JP2019/023830 filed on Jun. 17, 2019, 2 pages.

*Primary Examiner* — Magda Cruz
(74) *Attorney, Agent, or Firm* — Oblon, McClelland, Maier & Neustadt, L.L.P.

(57) ABSTRACT

A display apparatus includes a light source; an image generation unit; and a projection optical system. The image generation unit generates image light on the basis of light from the light source. The projection optical system includes a first lens system, a first reflective optical system, a second lens system, and a second reflective optical system. The first lens system refracts the generated image light. The first reflective optical system has first and second reflection surfaces that fold back and reflect the image light refracted by the first lens system. The second lens system refracts the image light reflected by the second reflection surface. The second reflective system has a recessed reflection surface for reflecting the image light refracted by the second lens system toward an object to be projected.

19 Claims, 12 Drawing Sheets

(51) Int. Cl.
   *G03B 21/00*    (2006.01)
   *G03B 21/20*    (2006.01)

(56) References Cited

U.S. PATENT DOCUMENTS

| | | | |
|---|---|---|---|
| 5,499,067 A | 3/1996 | Shibazaki | |
| 2001/0050758 A1* | 12/2001 | Suzuki | G02B 13/16 353/69 |
| 2008/0002158 A1 | 1/2008 | Matsuoka | |
| 2008/0158439 A1 | 7/2008 | Nishikawa | |
| 2010/0128234 A1* | 5/2010 | Nishikawa | H04N 9/3105 353/98 |
| 2010/0208364 A1* | 8/2010 | Minefuji | G02B 17/0816 359/731 |
| 2010/0245784 A1 | 9/2010 | Nishikawa | |
| 2011/0267687 A1 | 11/2011 | Kim et al. | |
| 2014/0002802 A1 | 1/2014 | Hsu et al. | |
| 2014/0204351 A1* | 7/2014 | Matsuo | G02B 13/16 353/98 |
| 2014/0340544 A1* | 11/2014 | Kimura | G02B 13/009 348/240.3 |
| 2016/0238822 A1* | 8/2016 | Minefuji | G02B 17/08 |
| 2016/0238825 A1* | 8/2016 | Minefuji | G02B 15/142 |
| 2016/0274344 A1* | 9/2016 | Lin | G02B 27/0025 |
| 2019/0285979 A1* | 9/2019 | Takano | G03B 21/008 |
| 2020/0004125 A1* | 1/2020 | Okano | G03B 21/208 |
| 2020/0142291 A1* | 5/2020 | Nishikawa | G02B 17/0828 |

FOREIGN PATENT DOCUMENTS

| | | |
|---|---|---|
| EP | 2 410 378 A1 | 1/2012 |
| JP | 7-13157 A | 1/1995 |
| JP | 10-111458 A | 4/1998 |
| JP | 2008-33290 A | 2/2008 |
| JP | 2008-116688 A | 5/2008 |
| JP | 2010-237356 A | 10/2010 |
| JP | 5365155 B2 | 12/2013 |
| JP | 2017-40849 A | 2/2017 |
| JP | 2017-198737 A | 11/2017 |
| WO | WO 2018/08199 A1 | 1/2018 |

* cited by examiner

| | |
|---|---|
| NA | 0.167 |
| Image modulation element (HxVSp) | 13.4 x 7.6 |
| Image modulation element central position (Chp) | 5.2 |
| Primary image plane side Image circle (imc) | 22.4 |
| Screen size (H x VSs) | 1771 x 996 |
| Screen size central position (Chs) | 853 |

FIG. 7

|  | Curvature radius | thickness | nd | νd | shape | dn/dT |
|---|---|---|---|---|---|---|
| P | ∞ |  |  |  |  |  |
| 1 | ∞ | 1.1 |  |  |  |  |
| 2 | ∞ | 3.7 | 1.517 | 64 |  |  |
| 3 | ∞ | 50.4 | 1.841 | 25 |  |  |
| 4 | 34.9 | 10.9 |  |  |  |  |
| 5 | 1648.0 | 6.3 | 1.808 | 23 | Positive | -2.6 |
| 6 | 26.1 | 5.5 |  |  |  |  |
| 7 | -58.8 | 7.0 | 1.620 | 60 | Positive | 2.5 |
| 8 | 19.9 | 2.5 | 1.805 | 25 | Negative | 1.0 |
| 9 | 80.0 | 4.9 |  |  |  |  |
| 10 | -17.9 | 6.1 | 1.487 | 70 | Positive | -1.3 |
| 11 | -34.0 | 1.2 | 1.805 | 25 | Negative | 1.0 |
| 12 | 147.4 | 20.9 |  |  |  |  |
| 13 | -81.8 | 2.6 | 1.808 | 23 | Positive | -2.6 |
| 14 | 43.7 | 50.7 |  |  |  |  |
| 15 | 49.2 | 8.5 | 1.847 | 24 | Positive | 0.6 |
| 16 * | -4.0 | 14.8 |  |  |  |  |
| 17 * | 4.0 | 3.9 | 1.509 | 57 |  |  |
| 18 | -24.3 | 32.6 |  |  |  |  |
| 19 | 49.2 | -51.3 | refl |  |  |  |
| 20 * | -24.3 | 51.3 | refl |  |  |  |
| 21 * | -51.9 | 3.0 | 1.623 | 58 |  |  |
| 22 | 86.5 | 17.7 |  |  |  |  |
| 23 | -78.3 | 4.5 | 1.593 | 67 |  |  |
| 24 | -134.1 | 2.9 |  |  |  |  |
| 25 | -34.6 | 3.6 | 1.805 | 25 |  |  |
| 26 | -22.2 | 3.2 |  |  |  |  |
| 27 | 566.4 | 1.7 | 1.847 | 24 |  |  |
| 28 | 1236.6 | 2.5 |  |  |  |  |
| 29 | -24.8 | 8.5 | 1.593 | 67 |  |  |
| 30 * | -50.7 | 132.0 |  |  |  |  |
| S | ∞ | -470.1 | refl |  |  |  |

* ··· Aspherical surface

L1: surfaces 1–15; L12: 16–17; R1 (Mr1: 18, Mr2: 19); L2: 20–28; R2: 29–30

| S16 | | | | | |
|---|---|---|---|---|---|
| K | -2.96E+00 | A2 | -2.34E-02 | A3 | 7.37E-03 |
| A4: | 5.24E-04 | A5 | -2.07E-04 | A6 | 1.86E-05 |
| A7 | -4.16E-07 | A8 | -3.71E-08 | A9 | 2.04E-09 |
| A10 | 3.78E-11 | A11 | -4.74E-12 | A12 | 8.88E-14 |

| S17 | | | | | |
|---|---|---|---|---|---|
| K | -5.31E+00 | A2 | -2.28E-01 | A3 | 4.38E-02 |
| A4 | -4.79E-03 | A5 | 3.41E-04 | A6 | -2.32E-05 |
| A7 | 2.49E-06 | A8 | -3.01E-07 | A9 | 2.56E-08 |
| A10 | -1.32E-09 | A11 | 3.70E-11 | A12 | -4.38E-13 |

| S18 | | | | | |
|---|---|---|---|---|---|
| K | -1.60E+00 | A3 | -6.66E-05 | A4 | 1.04E-04 |
| A5 | -1.27E-05 | A6 | 6.33E-07 | A7 | -4.64E-09 |
| A8 | -1.15E-09 | A9 | 5.68E-11 | A10 | -8.94E-13 |

| S20 | | | | | |
|---|---|---|---|---|---|
| K | -1.60E+00 | A3 | -6.66E-05 | A4 | 1.04E-04 |
| A5 | -1.27E-05 | A6 | 6.33E-07 | A7 | -4.64E-09 |
| A8 | -1.15E-09 | A9 | 5.68E-11 | A10 | -8.94E-13 |

| S21 | | | | | |
|---|---|---|---|---|---|
| A3 | -1.30E-03 | A4 | 1.05E-04 | A5 | -4.75E-06 |
| A6 | 1.05E-07 | | | | |

| S30 | | | | | |
|---|---|---|---|---|---|
| K | -1.02E+00 | A3 | 3.19E-04 | A4 | -2.23E-05 |
| A5 | 3.50E-07 | A6 | 2.52E-09 | A7 | -6.05E-11 |
| A8 | -7.97E-13 | A9 | 6.18E-15 | A10 | 2.85E-16 |
| A11 | -3.27E-18 | A12 | 5.98E-21 | | |

FIG.8

| | |
|---|---:|
| $\alpha 1$ | 6.30E-06 |
| $\alpha 2$ | 8.70E-06 |
| \|Z'f - Z'r\| | 32 |
| dn/dT (Positive)max | 2.5 |
| dn/dT (Positive)min | -2.6 |
| dn/dT (Negative)max | 1.0 |
| dn/dT (Negative)min | 1.0 |
| Z'f | -5.0 |
| Z'r | -36.5 |

FIG.9

| | Curvature radius | thickness | nd | νd | shape | dn/dT |
|---|---|---|---|---|---|---|
| P | ∞ | 1.1 | | | | |
| 1 | ∞ | 3.7 | 1.517 | 64 | | |
| 2 | ∞ | 38.4 | 1.841 | 25 | | |
| 3 | ∞ | 10.9 | | | | |
| 4 | 34.1 | 6.8 | 1.808 | 23 | Positive | -2.6 |
| 5 | -135.8 | 0.3 | | | | |
| 6 | 25.6 | 7.5 | 1.593 | 67 | Positive | -0.8 |
| 7 | -46.1 | 1.9 | 1.805 | 25 | Negative | 1.0 |
| 8 | 19.1 | 5.0 | | | | |
| 9 | 654.7 | 5.7 | 1.593 | 67 | Positive | -0.8 |
| 10 | -15.3 | 1.2 | 1.805 | 25 | Negative | 1.0 |
| 11 | -31.5 | 13.5 | | | | |
| 12 | 222.6 | 2.6 | 1.808 | 23 | Positive | -2.6 |
| 13 | -75.0 | 37.5 | | | | |
| 14 | 28.6 | 6.5 | 1.620 | 36 | Positive | 2.1 |
| 15 | ∞ | 4.0 | 1.620 | 60 | Negative | 2.4 |
| 16 | 50.4 | 16.9 | | | | |
| 17 * | -4.0 | 2.9 | 1.509 | 57 | | |
| 18 * | 4.0 | 32.6 | | | | |
| 19 * | -27.6 | -52.4 | refl | | | |
| 20 | 50.4 | 52.4 | refl | | | |
| 21 * | -27.6 | 3.0 | 1.623 | 58 | | |
| 22 * | -42.1 | 27.0 | | | | |
| 23 | 39.9 | 5.2 | 1.648 | 34 | | |
| 24 | -45.2 | 3.6 | | | | |
| 25 | -27.7 | 1.7 | 1.847 | 24 | | |
| 26 | 103.3 | 3.7 | | | | |
| 27 | 267.6 | 6.1 | 1.593 | 67 | | |
| 28 | -29.4 | 132.5 | | | | |
| 29 * | -41.7 | -470.0 | refl | | | |
| S | ∞ | | | | | |

* ... Aspherical surface

L1: rows 1–16
L12: rows 17–18
R1 (Mr1: 19, Mr2: 20)
L2: rows 21–28
R2: row 29

| K | -3.46E+00 | A2 | -5.36E-02 | A3 | 2.02E-02 |
| --- | --- | --- | --- | --- | --- |
| A4: | -1.69E-03 | A5 | -6.61E-05 | A6 | 2.36E-05 |
| A7 | -1.39E-06 | A8 | -3.77E-08 | A9 | 6.53E-09 |
| A10 | -9.38E-11 | A11 | -1.02E-11 | A12 | 3.24E-13 |

S18

| K | -4.52E+00 | A2 | -2.55E-01 | A3 | 6.04E-02 |
| --- | --- | --- | --- | --- | --- |
| A4 | -8.05E-03 | A5 | 5.91E-04 | A6 | -2.13E-05 |
| A7 | 8.13E-07 | A8 | -1.88E-07 | A9 | 2.32E-08 |
| A10 | -1.37E-09 | A11 | 4.02E-11 | A12 | -4.70E-13 |

S19

| K | -1.61E+00 | A3 | -5.59E-04 | A4 | 1.47E-04 |
| --- | --- | --- | --- | --- | --- |
| A5 | -1.61E-05 | A6 | 9.49E-07 | A7 | -2.68E-08 |
| A8 | -2.47E-10 | A9 | 4.03E-11 | A10 | -8.15E-13 |

S21

| K | -1.61E+00 | A3 | -5.59E-04 | A4 | 1.47E-04 |
| --- | --- | --- | --- | --- | --- |
| A5 | -1.61E-05 | A6 | 9.49E-07 | A7 | -2.68E-08 |
| A8 | -2.47E-10 | A9 | 4.03E-11 | A10 | -8.15E-13 |

S22

| A3 | -3.31E-04 | A4 | -1.37E-05 | A5 | 2.16E-06 |
| --- | --- | --- | --- | --- | --- |
| A6 | -7.14E-08 | | | | |

S29

| K | -2.25E+01 | A3 | 2.49E-04 | A4 | -3.94E-05 |
| --- | --- | --- | --- | --- | --- |
| A5 | 9.75E-07 | A6 | -1.46E-10 | A7 | -2.09E-10 |
| A8 | -1.10E-12 | A9 | 6.14E-14 | A10 | 5.34E-16 |
| A11 | -2.25E-17 | A12 | 1.47E-19 | | |

FIG.12

| | |
|---|---:|
| $\alpha 1$ | 6.30E-06 |
| $\alpha 2$ | 6.00E-06 |
| $|Z'f - Z'r|$ | 19 |
| dn/dT (Positive)max | 2.1 |
| dn/dT (Positive)min | -2.6 |
| dn/dT (Negative)max | 2.4 |
| dn/dT (Negative)min | 1.0 |
| $Z'f$ | -5.0 |
| $Z'r$ | -24.0 |

FIG.13

IMAGE DISPLAY DEVICE AND PROJECTION OPTICAL SYSTEM

TECHNICAL FIELD

The present technology relates to, for example, an image display apparatus such as a projector and a projection optical system.

BACKGROUND ART

In the past, a projector has been widely known as a projection image display apparatus for displaying a projection image on a screen. Recently, there has been an increasing demand for an ultra-wide-angle front-projection projector that is capable of displaying a large screen even on a small projection space. By using this projector, a large screen can be projected in a limited space by performing projection obliquely and at a wide angle with respect to a screen.

In the ultra-wide-angle projection projector described in Patent Literature 1, by moving a part of optical parts included in a projection optical system, the screen shift for moving the projection image projected on s screen can be performed. Fine adjustment of the image position and the like can be easily carried out by using this screen shift (e.g., paragraphs [0023] and [0024] in the specification of Patent Literature 1).

CITATION LIST

Patent Literature

Patent Literature 1: Japanese Patent No. 5365155

DISCLOSURE OF INVENTION

Technical Problem

It is considered that projectors compatible with ultra-wide-angles will continue to spread in the future, and a technology for realizing miniaturization and performance enhancement of the apparatus is desired.

In view of the circumstances as described above, it is an object of the present technology to provide an image display apparatus and a projection optical system that are compatible with ultra-wide-angles and capable of realizing miniaturization and performance enhancement of the apparatus.

Solution to Problem

In order to achieve the above-mentioned object, an image display apparatus according to an embodiment of the present technology includes: a light source; an image generation unit; and a projection optical system.

The image generation unit modulates light emitted from the light source to generate image light.

The projection optical system includes a first lens system, a first reflective optical system, a second lens system, and a second reflective optical system.

The first lens system has a positive refractive power as a whole and refracts the generated image light.

The first reflective optical system has a first reflection surface and a second reflection surface, the first reflection surface folding back and reflecting the image light refracted by the first lens system, the second reflection surface folding back and reflecting the image light reflected by the first reflection surface.

The second lens system has a positive refractive power as a whole and refracts the image light reflected by the second reflection surface.

The second reflective system has a recessed reflection surface reflecting the image light refracted by the second lens system toward an object to be projected.

Further, the image display apparatus is configured to satisfy the following relationship: $5 \times 10^{-7} < \alpha 1 < 3 \times 10^{-5}$, $\alpha 1$ representing a linear expansion coefficient of a first optical part on which the first reflection surface is formed.

In this image display apparatus, the image light refracted by the first lens system is folded back and reflected by each of the first and second reflection surfaces. As a result, the optical path length of the image light can be sufficiently ensured without increasing the size of the projection optical system. As a result, it is possible to realize miniaturization of the apparatus. Further, the linear expansion coefficient of the first optical part on which the first reflection surface is formed is defined by the above-mentioned conditional expression. This makes it possible to sufficiently suppress the influence of environmental changes, and performance enhancement is realized.

The image display apparatus may be configured to satisfy the following relationship: $5 \times 10^{-7} < \alpha 2 < 3 \times 10^{-5}$, $\alpha 2$ representing a linear expansion coefficient of a second optical part on which the second reflection surface is formed.

At least one of the first optical part or the second optical part may be formed of glass.

The first optical part and the second optical part may each be formed of glass.

The first optical part may have one or more transparent surfaces that are formed in an area different from the first reflection surface and cause the image light to be transmitted therethrough. In this case, the one or more transparent surfaces of the first optical part may function as the second lens system.

The second optical part may have one or more transparent surfaces that are formed in an area different from the second reflection surface and cause the image light to be transmitted therethrough. In this case, the one or more transparent surfaces of the second optical part may function as the first lens system.

The projection optical system may be configured with reference to a predetermined reference axis. In this case, the first lens system may include the nearest optical part that has an incident surface and an emission surface and is disposed at a position closest to the first reflection surface, the image light entering the incident surface, the emission surface refracting the image light that has entered from the incident surface and emitting the refracted light to the first reflection surface.

Further, the image display apparatus may be configured to satisfy the following relationship: $1 < |Z'f(hmax1) - Z'r(hmax2)| < 45$, h representing a light beam height from the reference axis, $Z'f(h)$ representing a derivative function obtained by differentiating a function $Zf(h)$ with the light beam height, the function $Zf(h)$ representing a shape of the incident surface of the nearest optical part corresponding to the light beam height, hmax1 representing a light beam height corresponding to an incident position of outermost incident light on the incident surface, the outermost incident light entering the incident surface at a position furthest from the reference axis, hmax2 representing a light beam height corresponding to an emission position of the outermost incident light, the outermost incident light being emitted from the emission surface at the emission position.

The outermost incident light may be light emitted from a position farthest from the reference axis of the image generation unit.

At least one of the incident surface or the emission surface of the nearest optical part may be an aspherical surface.

The incident surface and the emission surface of the nearest optical part may each be an aspherical surface.

The nearest optical part may be formed of plastic.

The image display apparatus may be configured such that a refractive index temperature coefficient dn/dt of each of one or more optical parts satisfies the following relationship; −5<dn/dT<5, the one or more optical parts being included in the first lens system, formed of a material different from plastic, and having a positive refractive power.

The image display apparatus may be configured such that a refractive index temperature coefficient dn/dt of each of one or more optical parts satisfies the following relationship; −5<dn/dT<5, the one or more optical parts being included in the first lens system, formed of a material different from plastic, and having a negative refractive power.

All optical parts included in the first lens system other than the nearest optical part may each be formed of a material different from plastic.

The reference axis may be an axis obtained by extending an optical axis of a lens disposed at a position closest to the image generation unit, the lens being included in the first lens system.

The projection optical system may be configured such that each optical axis of all of the optical parts included in the projection optical system coincides with the reference axis.

The recessed reflection surface may be configured such that a rotational symmetry axis coincides with the reference axis. In this case, each of the first reflection surface and the second reflection surface may be a recessed reflection surface and configured such that a rotational symmetry axis thereof coincides with the reference axis.

The second reflective optical system may form an image of the image light on a plane portion included in the object to be projected.

A projection optical system according to an embodiment of the present technology is a projection optical system that projects image light generated by modulating light emitted from a light source, including the first lens system; the first reflective optical system; the second lens system; and the second reflective optical system.

Further, the projection optical system is configured to satisfy the following relationship: $5 \times 10^{-7} < \alpha 1 < 3 \times 10^{-5}$, $\alpha 1$ representing a linear expansion coefficient of a first optical part on which the first reflection surface is formed.

Advantageous Effects of Invention

As described above, in accordance with the present technology, it is possible to cope with ultra-wide-angles, and realize miniaturization and performance enhancement of the apparatus. Note that the effect described here is not necessarily limitative, and any of the effects described in the present disclosure may be provided.

BRIEF DESCRIPTION OF DRAWINGS

FIG. 7 shows lens data of the image display apparatus.

FIG. 8 is a table showing an example of aspheric coefficients of optical parts included in the projection optical system.

FIG. 9 is a table showing numerical values of the parameters used in conditional expressions (1) to (5).

FIG. 11 shows lens data of the image display apparatus.

FIG. 12 is a table showing an example of aspheric coefficients of optical parts included in the projection optical system.

FIG. 13 is a table showing numerical values of the parameters used in the conditional expressions (1) to (5).

MODE(S) FOR CARRYING OUT THE INVENTION

Hereinafter, an embodiment according to the present technology will be described with reference to the drawings.

[Outline of Projection Image Display Apparatus]

The outline of the projection image display apparatus will be briefly described by exemplifying a liquid crystal projector. The liquid crystal projector spatially modulates the light applied from a light source to form an optical image (image light) corresponding to the video signal. For the modulation of the light, a liquid crystal display element or the like is used as an image modulation element. For example, a three-plate liquid crystal projector including a panel-shaped liquid crystal display element (liquid crystal panel) corresponding to each of RGB is used.

The optical image is magnified and projected by the projection optical system and displayed on a screen. Here, description will be made assuming that the projection optical system is compatible with ultra-wide angles in which the half angle of view is, for example, approximately 70°. It goes without saying that the angle is not limited to this angle.

In the liquid crystal projector compatible with ultra-wide-angles, a large screen can be displayed even in a small projection space. That is, even in the case where the distance between the liquid crystal projector and the screen is short, the enlargement projection can be performed. As a result, the following advantages are exhibited.

Because the liquid crystal projector can be disposed close to the screen, it is possible to sufficiently reduce the possibility of direct entry of light from the liquid crystal projector into the human eye, and achieve a higher degree of security.

Since the screen does not show a shadow of a person or the like, efficient presentation can be made.

The degree of freedom of selecting the installation site is high, and it can be easily installed even in a narrow installation space, a ceiling with many obstacles, or the like.

By using it installed on the wall, it is easy to perform maintenance such as routing of the cable as compared with the case of installing it on the ceiling.

For example, it is possible to increase the degree of freedom of setting a meeting space, a classroom, a conference room, and the like.

Figure 1:
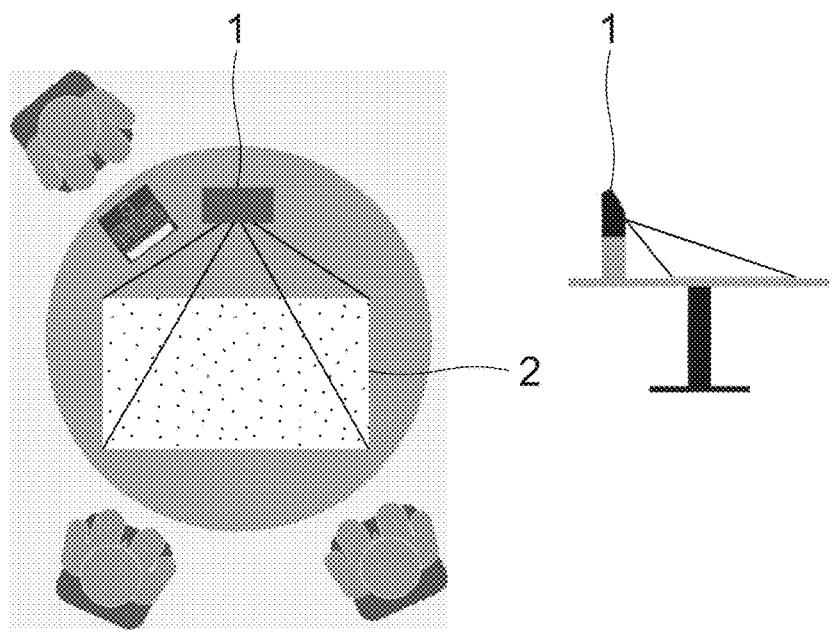
FIG. 1 is a schematic diagram for describing other advantages of a liquid crystal projector compatible with ultra-wide-angles.

FIG. 1 is a schematic diagram for describing other advantages of the liquid crystal projector compatible with ultra-wide-angles. As shown in FIG. 1, by installing a liquid crystal projector 1 compatible with ultra-wide-angles on a table, an enlarged image 2 can be projected onto the same table. Such use is also possible, and space can be efficiently used.

Recently, with the widespread use of electronic blackboards (Interactive White Board) and the like in schools, workplaces, and the like, there has been an increasing demand for a liquid crystal projector compatible with ultra-wide-angles. Further, a similar liquid crystal projector is also used in the field of digital signage (electronic advertising) and the like. Note that as the electronic blackboard, for example, a technology such as an LCD (Liquid Crystal Display) and a PDP (Plasma Display Panel) can be used. As compared with these, by a liquid crystal projector compatible with ultra-wide-angles, s large screen can be provided with reduced costs. Note that the liquid crystal projector compatible with ultra-wide angles is referred to also as a short focus projector, an ultra-short focus projector, or the like.

First Embodiment

[Image Display Apparatus]

Figure 2:
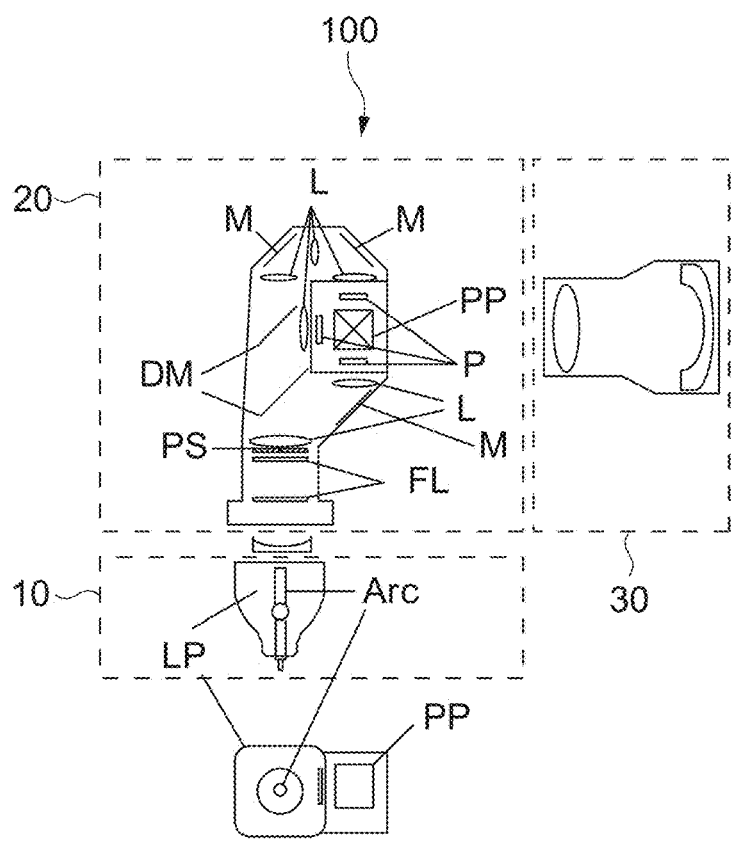
FIG. 2 is a schematic diagram showing a configuration example of a projection image display apparatus according to a first embodiment.

FIG. 2 is a schematic diagram showing a configuration example of a projection image display apparatus according to a first embodiment of the present technology. An image display apparatus 100 includes a light source 10, a lighting optical system 20, and a projection optical system 30.

The light source 10 is disposed to emit a light beam to the lighting optical system 20. As the light source 10, for example, a high-pressure mercury lamp or the like is used. Alternatively, a solid-state light source such as an LED (Light Emitting Diode) and an LD (Laser Diode) may be used.

The lighting optical system 20 uniformly applies a light beam emitted from the light source 10 onto the surface of image modulation element (liquid crystal panel P) serving as the primary image plane. In the lighting optical system 20, the light beam from the light source 10 passes through two fly-eye lenses FL, a polarization conversion element PS, and a condenser lens L in this order, and is converted into a uniform light beam of polarized light.

The light beam that has passed through the condenser lens L is separated into light of RGB color components by a dichroic mirror DM that reflects only light in a particular wavelength band. The light of the respective RGB color components enters the liquid crystal panel P (image modulation element) provided corresponding to the respective RGB colors via a total reflection mirror M, the lens L, and the like. Then, optical modulation according to the video signal is performed by the respective liquid crystal panels P. The modulated lights of the color components are combined by a dichroic prism PP, and image light forming an image is generated. The generated image light is emitted toward the projection optical system 30.

The optical part or the like constituting the lighting optical system 20 is not limited, and an optical part different from the optical part described above may be used. For example, as an image modulation element, a reflective liquid crystal panel, a digital micromirror device (DMD), or the like may be used instead of the transmission-type liquid crystal panel P. Further, for example, a polarizing beam splitter (PBS), a color combination prism that combines video signals of RGB colors, a TIR (Total Internal Reflection) prism, or the like may be used instead of the dichroic prism PP. In this embodiment, the lighting optical system 20 corresponds to the image generation unit.

The projection optical system 30 adjusts the image light emitted from the lighting optical system 20 and projects the image light onto a screen serving as a secondary image plane in an enlarged manner. That is, image information of the primary image plane (the liquid crystal panel P) is adjusted by the projection optical system 30, and is enlarged and projected onto the secondary image plane (screen).

In this embodiment, the screen corresponds to the object to be projected, and the portion of the screen where the image is projected corresponds to the plane portion of the object to be projected. In addition, the object to be projected is not limited, and the present technology is applicable to displaying an image on an arbitrary object to be projected such as a table shown in FIG. 1 and walls of buildings.

Figure 3:
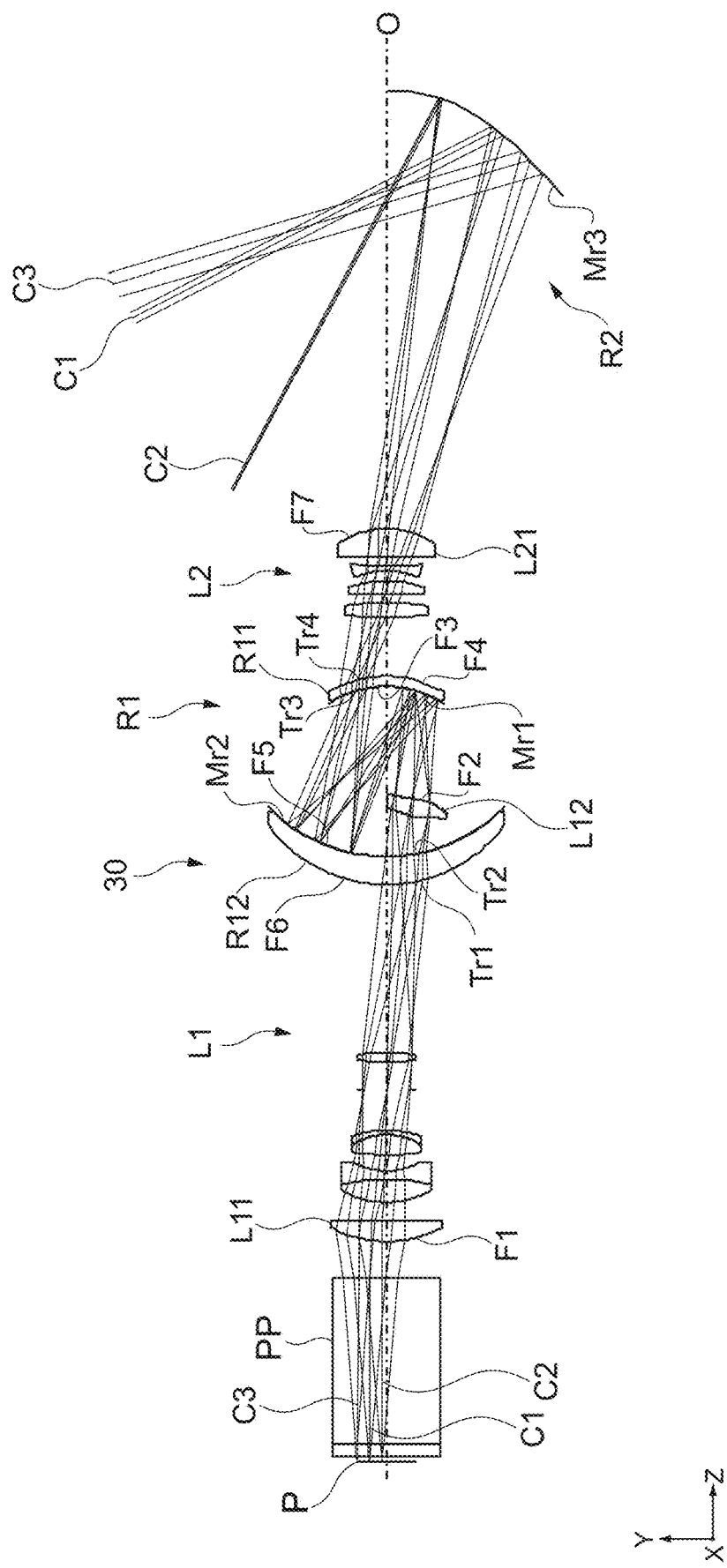
FIG. 3 is an optical path diagram showing a schematic configuration example of a projection optical system according to first the embodiment.

FIG. 3 is an optical path diagram showing a schematic configuration example of a projection optical system according to the first embodiment. Here, the liquid crystal panel P and the dichroic prism PP of the lighting optical system 20 are schematically illustrated.

Hereinafter, the emission direction of the image light emitted from the dichroic prism PP to the projection optical system is defined as the Z-direction. Further, the lateral direction of the primary image plane (the liquid crystal panel P) is defined as the X-direction, and the longitudinal direction is defined as the Y-direction. The X-direction and the Y-direction are directions corresponding to the lateral direction and the longitudinal direction of an image to be enlarged and projected onto the secondary image plane (screen).

Further, for convenience, description is made by using the Z-direction in the drawing as the right-and-left direction and the Y-direction as the up-and-down direction in some cases assuming that the projection optical system is viewed from the side. It goes without saying that the traveling direction of the image light is not limited to this direction, and the traveling direction of the image light is determined in accordance with the orientation, posture, and the like of the image display apparatus 100.

The projection optical system 30 includes a first lens system L1, a first reflective optical system R1, a second lens system L2, and a second reflective optical system R2. The first lens system L1 has a positive refractive power as a whole and refracts the image light generated by the lighting optical system 20.

In this embodiment, the portion from an incident surface F1 where image light of a lens L11 disposed at the position closest to the lighting optical system 20 enters to an emission surface F2 where image light of a lens L12 (hereinafter, referred to as the nearest lens L12) disposed at the position closest to a first reflection surface Mr1 is emitted function as the first lens system L1.

As shown in FIG. 3, the first lens system L1 is configured with reference to a reference axis extending in the Z-direction (hereinafter, this reference axis will be referred to as the optical axis O). Specifically, the first lens system L1 is configured such that the optical axis of each of one or more optical parts included in the first lens system L1 substantially coincides with the optical axis O that is a reference axis.

The optical axis of the optical part is typically an axis that passes through the center of an optical surface such as a lens surface and a reflection surface of the optical part. For example, in the case where the optical surface of the optical part has a rotational symmetry axis, the rotational symmetry axis corresponds to the optical axis. Note that as in the nearest lens L12, there may be a case where only a part including an active area, which is an area where image light enters, of an optical part disposed so that its own optical axis substantially coincides with the optical axis O is used. By using a part of the optical part, the projection optical system 30 can be miniaturized.

In this embodiment, the optical axis O is an axis obtained by extending the optical axis (rotational symmetry axis) of the lens L11 disposed at a position closest to the lighting optical system 20, which is included in the first lens system L1. That is, another optical part is disposed on the axis obtained by extending the optical axis of the lens L11.

Note that the image light is emitted along the optical axis O from a position offset from the optical axis O in the perpendicular direction (the up-and-down direction). In this embodiment, the direction along the optical axis O can also be referred to as the optical path traveling direction of the first lens system L1.

The first reflective optical system R1 includes the first reflection surface Mr1 and a second reflection surface Mr2. In this embodiment, the two reflection surfaces function as the first reflective optical system R1.

The first reflection surface Mr1 is disposed below the optical axis O, and folds back and reflects the image light refracted by the first lens system L1. Specifically, the image light entering from the left side is folded back and reflected toward the upper left side.

In this embodiment, a first optical part R11 is disposed such that the rotational symmetry axis substantially coincides with the optical axis O. The first optical part R11 has a rotationally symmetric aspherical surfaces F3 and F4. The first reflection surface Mr1 is formed in an area of the aspherical surface F3 of the first optical part R11 where the image light emitted from the first lens system L1 enters.

The second reflection surface Mr2 is disposed above the optical axis O, and folds back and reflects the image light reflected by the first reflection surface Mr1 towards the second lens system L2. Specifically, the image light entering from the lower right side is folded back and reflected toward the right side.

In this embodiment, a second optical part R12 is disposed such that the rotational symmetry axis substantially coincides with the optical axis O. The second optical part R12 has rotationally symmetric surfaces F5 and F6. The second reflection surface Mr2 is formed in an area of the rotationally symmetric surface F5 of the second optical part R12 where the image light reflected by the first reflection surface Mr1 enters.

Note that as shown in FIG. 3, in the rotationally symmetric surfaces F5 and F6 of the second optical part R12, transparent surfaces Tr1 and Tr2 that cause the image light emitted from the side of the lens L11 to be transmitted therethrough are formed. The transparent surfaces Tr1 and Tr2 are formed in an area different from the second reflection surface Mr2 of the second optical part R12. The transparent surfaces Tr1 and Tr2 function as the first lens system L1.

Thus, an optical surface (the transparent surfaces Tr1 and Tr2) that functions as the first lens system L1 and an optical surface (the second reflection surface Mr2) that functions as the first reflective optical system R1 may be realized by one optical part. As a result, it is possible to miniaturize the projection optical system 30. Further, by using the second optical part R12 having a rotational symmetry axis, it is possible to improve the assembly accuracy of the projection optical system 30.

Similarly, also in the first optical part R11, transparent surfaces Tr3 and Tr4 that cause the image light reflected by the second reflection surface Mr2 to be transmitted therethrough are respectively formed in the aspherical surface F3 and the F4. The transparent surfaces Tr3 and Tr4 are formed in an area different from the first reflection surface Mr1 of the first optical part R11. The transparent surfaces Tr3 and Tr4 function as the second lens system L2.

By realizing each of the optical surface of the different optical systems by one optical part as describe above, it is possible to miniaturize the projection optical system 30. In addition, it is possible to improve the assembly accuracy of the projection optical system 30.

Note that the method of forming a reflection surface and a transparent surface on one optical part is not limited. For example, a reflective film formed of aluminum or the like is deposited in a predetermined area formed of s light-transmitting material such as transparent acrylics and glasses, so that the predetermined area can be realized as a reflection surface. In addition, by depositing an anti-reflection film in an area serving as a transparent surface, light loss or the like can be suppressed. In addition, an arbitrary method may be employed.

The second lens system L2 has a positive refractive index as a whole and refracts the image light reflected by the first reflective optical system R1, i.e. the image light reflected by the second reflection surface Mr2. In this embodiment, the portion from the transparent surface Tr3 formed on the first optical part R11 to an emission surface F7 where image light of the lens L21 disposed at the position closest to the second reflective optical system R2 is emitted functions as the second lens system L2.

The second lens system L2 is configured with reference to the optical axis O. Specifically, the second lens system L2 is configured such that the optical axis of each of the one or more optical parts included in the second lens system L2 substantially coincides with the optical axis O that is a reference axis.

The second reflective optical system R2 has a recessed reflection surface Mr3. In this embodiment, this recessed reflection surface Mr3 functions as the second reflective optical system R2.

The recessed reflection surface Mr3 reflects the image light refracted by the second lens system L2 toward the screen. The recessed reflection surface Mr3 is a rotationally symmetric aspherical surface configured such that the rotational symmetry axis coincides with the optical axis O, and includes only a part including an active area that is a region where image light enters. That is, not the entire rotationally symmetric aspheric surface but only the necessary portion of the rotationally symmetric aspheric surface is disposed. This makes it possible to realize the miniaturization of the apparatus.

As shown in FIG. 3, in this embodiment, the first lens system L1, the first reflective optical system R1, the second lens system L2, and the second reflective optical system R2 are formed on the common optical axis O. That is, the first lens system L1, the first and second reflection surfaces Mr1 and Mr2, the second lens system L2, and the recessed reflection surface Mr3 are formed so that the axis obtained by extending the optical axis (rotational symmetry axis) of the lens L11 disposed at the position closest to the lighting optical system 20 substantially coincides with the respective optical axes (rotational symmetry axes). This makes it possible to reduce the size in the Y-direction, and miniaturize the apparatus.

As described above, the entire projection optical system 30 may be configured with reference to the optical axis O. That is, each of the optical axes of all of the optical parts included in the projection optical system 30 may be configured to substantially coincide with the optical axis O that is a reference axis. It goes without saying that the present invention is not limited thereto, and an optical part whose optical axis is offset from the optical axis O may be included in the projection optical system 30.

In this embodiment, the transparent surfaces Tr1 and Tr2 correspond to the one or more transparent surfaces of the second optical part R12. Further, the transparent surfaces Tr3 and Tr4 correspond to the one or more transparent surfaces of the first optical part R11. The number of transparent surfaces formed on the first and second optical parts R11 and R12 is not limited, and three or more transparent surfaces may be formed. Further, the nearest lens L12 corresponds to the nearest optical part.

The optical path of image light will be described with reference to FIG. 3. In FIG. 3, optical paths of three pixel lights C1, C2, and C3, of the image light emitted from the dichroic prism PP to the projection optical system 30, are illustrated.

As will be described below with reference to FIG. 6, the pixel light C1 corresponds to the pixel light emitted from the pixel in the center of the liquid crystal panel P. Hereinafter, the pixel light C1 will be described as a main light beam C1 in some cases. The pixel light C2 corresponds to the pixel light emitted from the pixel closest to the optical axis O in the center of the liquid crystal panel P. The pixel light C3 corresponds to the pixel light emitted from the pixel farthest from the optical axis O in the center of the liquid crystal panel P.

That is, in this embodiment, the pixel light C2 corresponds to the pixel light emitted from the pixel closest to the optical axis O of the liquid crystal panel P. Further, the pixel light C3 corresponds to the pixel light emitted from the pixel farthest from the optical axis O, which is located on a straight line connecting the pixel closest to the optical axis O to the central pixel of the liquid crystal panel P.

The image light emitted from a position offset upwardly from the optical axis O to the projection optical system 30 along the optical axis O crosses the optical axis O in the first lens system L1 and travels downwardly. Then, the image light emitted from the first lens system L1 is folded back to the upper left by the first reflection surface Mr1 and crosses the optical axis O again.

The image light folded back toward the upper left is folded back by the second reflection surface Mr2 and reflected toward the second lens system L2. Then, the image light crosses the optical axis O again and travels to the lower right. The image light traveling toward the lower right is reflected by the recessed reflection surface Mr3, crosses the optical axis O again, and travels toward the screen.

As described above, in this embodiment, the optical path of image light is configured such that the main light beam C1 crosses the optical axis O four times. As a result, the optical path of image light to the recessed reflection surface Mr3 can be formed in the vicinity of the optical axis O. As a result, it is possible to reduce the size of the projection optical system 30 in the Y-direction, and miniaturize the apparatus.

Further, the image light is folded back and reflected by each of the first and second reflection surfaces Mr1 and Mr2. As a result, the optical path length of image light can be sufficiently secured. As a result, it is possible to reduce the size of the apparatus in the X-direction, and miniaturize the apparatus.

Further, in the projection optical system 30 according to this embodiment, a plurality of intermediate images (not shown) is formed between the dichroic prism PP and the recessed reflection surface Mr3 included in the lighting optical system 20. The intermediate image is an intermediate image of an image formed by image light. As a result, image light can be projected at an ultra-wide-angle. For example, a large screen can be displayed even in the case where the distance between a projector and a screen is short.

In order to form a high-precision image on a planar screen by the recessed reflection surface Mr3, it is important to optically correctly correct the image generated by the lighting optical system 20 and guide it to the recessed reflection surface Mr3. In this embodiment, since the optical path length of image light can be sufficiently secured by the first and second reflection surfaces Mr1 and Mr2, it is possible to accurately perform the optical correction of an image. That is, an appropriate intermediate image can be generated, and a high-precision image can be easily formed on a screen.

Further, since the optical path length is sufficiently secured, it is possible to suppress the optical load required to generate an appropriate intermediate image, and suppress the optical power of each of the optical parts included in the projection optical system 30. As a result, it is possible to miniaturize the respective optical parts, and realize the miniaturization of the entire apparatus.

Further, since a plurality of intermediate images is formed in the projection optical system 30, an optimal intermediate image can be generated with high accuracy. This allows the recessed reflection surface Mr3 to display a high-precision image on a screen. As described above, by using the projection optical system 30 according to this embodiment, it is possible to realize performance enhancement of the apparatus.

Here, the present inventors have found five conditions (1) to (5) regarding miniaturization and performance enhancement of the apparatus with respect to the projection optical system 30.

(Condition 1)

A linear expansion coefficient (/° C.) of the first optical part R11 on which the first reflection surface Mr1 is formed is defined as $\alpha 1$.

In this case, the projection optical system 30 is configured to satisfy the following relationship.

$$5\times10^{-7}<\alpha 1<3\times10^{-5} \quad (1)$$

In the case where a linear expansion coefficient $\alpha 1$ of the first optical part R11 exceeds the upper limit specified in a conditional expression (1), the change in curvature due to heat becomes large, so that the imaging performance of an image at high temperature is greatly deteriorated. In the case where the linear expansion coefficient $\alpha 1$ exceeds the lower limit specified in the conditional expression (1), the selection range of materials that can be employed as the first optical part R11 is reduced, which increases material costs. Therefore, the first optical part R11 becomes very expensive, and it becomes difficult to reduce costs.

By appropriately selecting the material of the first optical part R11 so that the linear expansion coefficient $\alpha 1$ satisfies the conditional expression (1), the above-mentioned problems can be sufficiently suppressed. That is, it is possible to sufficiently suppress the influence of the environmental change (temperature change). In addition, it is possible to sufficiently suppress the cost of the first optical part R11, and realize the cost reduction.

In this embodiment, the first optical part R11 is formed of glass. The specific type of the glass material is not limited, and an arbitrary glass material satisfying the conditional expression (1) may be employed. It goes without saying that another arbitrary material different from glass may be employed as long as the conditional expression (1) is satisfied. For example, a resin material such as acrylic, a metal material, a crystal material such as quartz, or the like may be used.

(Condition 2)

The linear expansion coefficient (/° C.) of the second optical part R12 on which the second reflection surface Mr2 is formed defined as α2.

In this case, the projection optical system 30 is configured to satisfy the following relationship.

$$5\times10^{-7}<\alpha2<3\times10^{-5} \qquad (2)$$

In the case where the linear expansion coefficient α2 of the second optical part R12 exceeds the upper limit specified in the conditional expression (2), the change in curvature due to heat becomes large, so that the imaging performance of an image at high temperature is greatly deteriorated. In the case where the linear expansion coefficient α2 exceeds the lower limit specified in the conditional expression (2), the selection range of materials that can be employed as the second optical part R12 is reduced, which increases material costs. Therefore, the second optical part R12 becomes very expensive, and it becomes difficult to reduce costs.

The above-mentioned problems can be sufficiently suppressed by appropriately selecting the material of the second optical part R12 so that the linear expansion coefficient α2 satisfies the conditional expression (2). That is, it is possible to sufficiently suppress the influence of the environmental change (temperature change). In addition, it is possible to sufficiently suppress the cost of the second optical part R12, and reduce the cost.

In this embodiment, the second optical part R12 is formed of glass. The specific type of the glass material is not limited, and an arbitrary glass material satisfying the conditional expression (2) may be employed. It goes without saying that another arbitrary material different from glass may be employed as long as the conditional expression (2) is satisfied.

In this embodiment, both the first and second optical parts R11 and R12 are formed of glass. It goes without saying that the present technology is not limited thereto. For example, at least one of the first and second optical parts R11 and R12 may be formed of glass.

(Conditional Expression 3)

Figure 4:
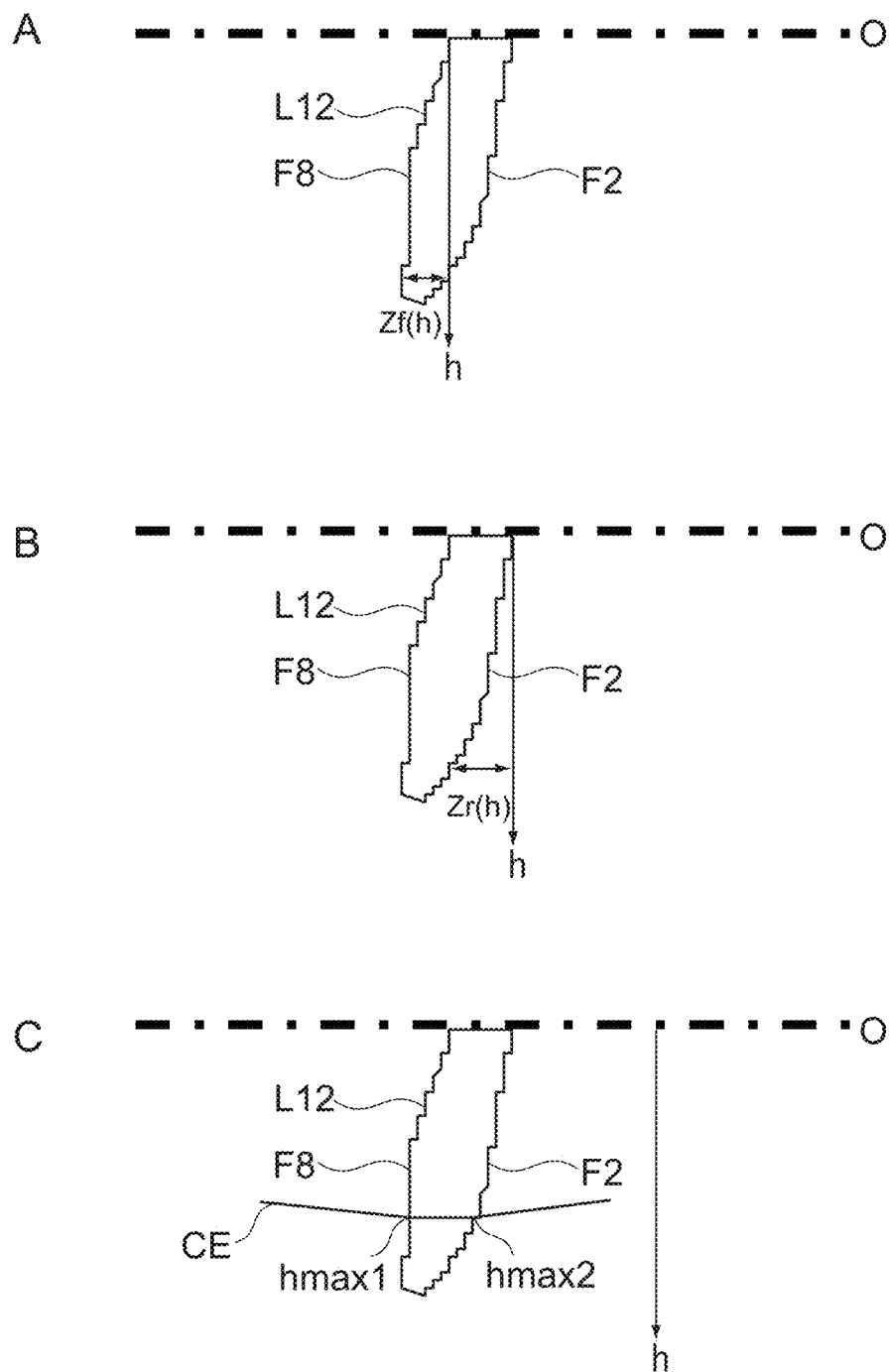
FIG. 4 is a schematic diagram for describing a conditional expression 3.

FIG. 4 is a schematic diagram for describing a conditional expression 3. As shown in FIG. 4, the nearest lens L12 disposed at a position closest to the first reflection surface Mr1 has an incident surface F8 and the emission surface F2. The incident surface F8 is a surface where image light enters. The emission surface F2 is a surface that refracts the image light entering from the incident surface F8 and emits the refracted image light to the first reflection surface Mr1.

As shown in Part A of FIG. 4 to Part C of FIG. 4, the light beam height from the optical axis O that is a reference axis is defined as h.

A derivative function obtained by differentiating a function Zf(h) with the light beam height is defined as Z'f(h), the function Zf(h) representing a shape of the incident surface F8 of the nearest lens L12 corresponding to the light beam height. Therefore, the derivative function Z'f(h) corresponds to the slope of the straight line tangent to the incident surface F8 in the light beam height h.

A derivative function obtained by differentiating a function Zr(h) with the light beam height is defined as Z'r(h), the function Zr(h) representing a shape of the emission surface F2 of the nearest lens L12 corresponding to the light beam height. Therefore, the derivative function Z'r(h) corresponds to the slope of the straight line tangent to the emission surface F2 in the light beam height h.

A light beam height corresponding to an incident position of outermost incident light CE on the incident surface F8 is defined as hmax1, the outermost incident light CE entering the incident surface F8 at a position furthest from the optical axis O.

A light beam height corresponding to an emission position of the outermost incident light CE is defined as hmax2, the outermost incident light CE being emitted from the emission surface F2 at the emission position.

In this case, the projection optical system 30 is configured to satisfy the following relationship.

$$1<|Z'f(h\ max1)-Z'r(h\ max2)|<45 \qquad (3)$$

This conditional expression (3) defines the optical power (refractive power) of the nearest lens L12 disposed at the position closest to the first reflection surface Mr1. In the case where |Z'f(hmax1)−Z'r(hmax2)| exceeds the upper limit specified in the conditional expression (3), the refractive effects of the lens are large, so that the imaging performance when the refractive index or the linear expansion changes is greatly deteriorated at a high temperature. In the case where |Z'f(hmax1)−Z'r(hmax2)| exceeds the lower limit specified in the conditional expression (3), the refractive effects become small, so that the lens cannot sufficiently function as a lens, and it becomes difficult to achieve sufficient imaging performance.

By configuring the nearest lens L12 so as to satisfy the conditional expression (3), the above-mentioned problems can be sufficiently suppressed. That is, it is possible to sufficiently suppress the influence of the environmental change (temperature change), and realize high imaging performance.

In this embodiment, the nearest lens L12 is formed of plastic. As a result, it is possible to improve the designing accuracy of the nearest lens L12. The specific type of the plastic material is not limited, and an arbitrary plastic material may be employed. The plastic material has a relatively large change in refractive index or linear expansion at a high temperature. Therefore, it is very effective to realize a configuration satisfying the conditional expression (3).

(Conditional Expression 4)

The projection optical system 30 is configured such that a refractive index temperature coefficient dn/dt of each of one or more optical parts satisfies the following relationship, the one or more optical parts being included in the first lens system L1, formed of a material different from plastic, and having a positive refractive power.

$$-5<dn/dT<5 \qquad (4)$$

That is, the projection optical system 30 is configured such that the refractive index temperature coefficient dn/dt of each of all of the optical parts satisfies the conditional expression (4), the optical parts being included in the first lens system L1, formed of a material different from plastic, and having a positive refractive power.

In the optical part where the refractive index temperature coefficient dn/dt does not satisfy the conditional expression (4), the focus position on the secondary image plane (screen) becomes large. Then, in the case where the refractive index temperature coefficient dn/dt exceeds the upper limit specified in the conditional expression (4), the focus position of an image moves toward the projection optical system 30, i.e., toward the front of the screen, at a high temperature. In the case where the refractive index temperature coefficient dn/dt exceeds the lower limit specified in the conditional expression (4), the focus position of an image moves away from the projection optical system 30, i.e., toward the back of the screen, at a high temperature. In any case, the imaging performance of an image at a high temperature is greatly deteriorated.

By configuring the first lens system L1 so as to satisfy the conditional expression (4), the above-mentioned problems can be sufficiently suppressed. That is, it is possible to sufficiently suppress the influence of the environmental change (temperature change), and realize high imaging performance.

(Conditional Expression 5)

The projection optical system 30 is configured such that a refractive index temperature coefficient dn/dt of each of one or more optical parts satisfies the following relationship, the one or more optical parts being included in the first lens system L1, formed of a material different from plastic, and having a negative refractive power.

$$-5<dn/dT<5 \quad (5)$$

That is, the projection optical system 30 is configured such that the refractive index temperature coefficient dn/dt of each of all of the optical parts satisfies the conditional expression (5), the optical parts being included in the first lens system L1, formed of a material different from plastic, and having a negative refractive power.

In the optical part where the refractive index temperature coefficient dn/dt does not satisfy the conditional expression (5), the focus position on the secondary image plane (screen) becomes large. Then, in the case where the refractive index temperature coefficient dn/dt exceeds the upper limit specified in the conditional expression (5), the focus position of an image moves away from the projection optical system 30, i.e., toward the back of the screen, at a high temperature. In the case where the refractive index temperature coefficient dn/dt exceeds the lower limit specified in the conditional expression (5), the focus position of an image moves toward the projection optical system 30, i.e., toward the front of the screen, at a high temperature. In any case, the imaging performance of an image at a high temperature is greatly deteriorated.

By configuring the first lens system L1 so as to satisfy the conditional expression (5), the above-mentioned problems can be sufficiently suppressed. That is, it is possible to sufficiently suppress the influence of the environmental change (temperature change), and realize high imaging performance.

The lower limit value and the upper limit value of each of the conditional expressions (1) to (5) are not limited to the values described above. For example, the respective values can be changed as appropriate in accordance with the configuration of the lighting optical system 20, the projection optical system 30, or the like. For example, an arbitrary value included in the above-mentioned range may be selected as the lower limit value and the upper limit value, and may be set as the optimum range again.

For example, the conditional expression (1) can be set to the following ranges.

$$4.7\times10^{-6}<\alpha1<1.45\times10^{-5}$$

$$1.0\times10^{-6}<\alpha1<2.0\times10^{-5}$$

$$2.0\times10^{-6}<\alpha1<1.0\times10^{-5}$$

$$3.0\times10^{-6}<\alpha1<9.0\times10^{-6}$$

For example, the conditional expression (2) can be set to the following ranges.

$$4.7\times10^{-6}<\alpha2<1.45\times10^{-5}$$

$$1.0\times10^{-6}<\alpha2<2.0\times10^{-5}$$

$$2.0\times10^{-6}<\alpha2<1.0\times10^{-5}$$

$$3.0\times10^{-6}<\alpha2<9.0\times10^{-6}$$

For example, the conditional expression (3) can be set to the following ranges.

$$5<|z'f(h\ max1)-z'r(h\ max2)|<40$$

$$10<|Z'f(h\ max1)-Z'r(h\ max2)|<35$$

$$15<|Z'f(h\ max1)-Z'r(h\ max2)|<35$$

$$19<|Z'f(h\ max1)-Z'r(h\ max2)|<32$$

For example, the conditional expression (4) can be set to the following ranges.

$$-4<dn/dT<4$$

$$-3<dn/dT<3$$

$$-2.6<dn/dT<2.5$$

For example, the conditional expression (5) can be set to the following ranges.

$$-4<dn/dT<4$$

$$-3<dn/dT<3$$

$$0<dn/dT<3$$

$$1.0<dn/dT<2.4$$

The projection optical system 30 configured as described above will be briefly described with reference to specific numerical examples.

Figures 5, 6:
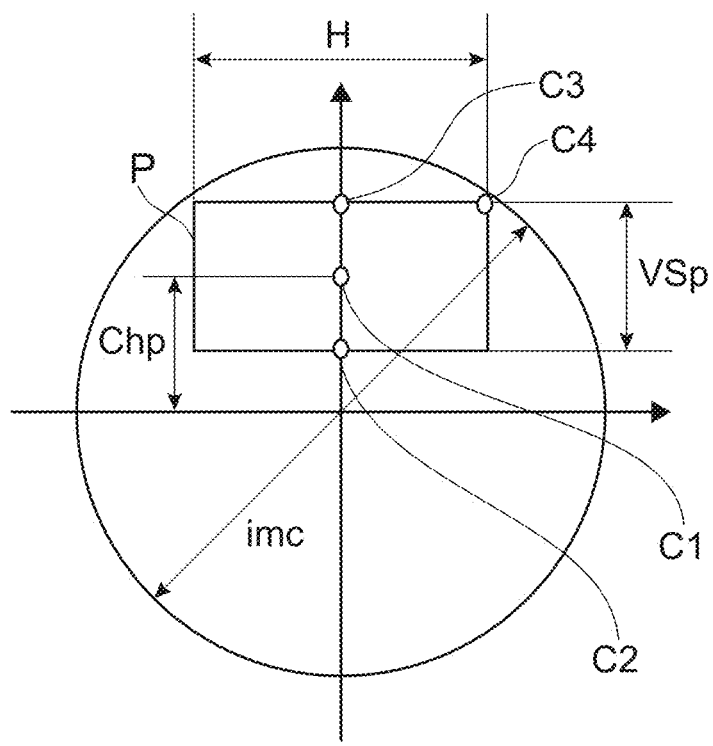
FIG. 5 is a table showing an example of parameters relating to image projection.
FIG. 6 is a schematic diagram for describing the parameters shown in FIG. 5.

FIG. 5 is a table showing an example of parameters relating to image projection. FIG. 6 is a schematic diagram for describing the parameters shown in FIG. 5.

A numerical aperture NA of the projection optical system 30 on the side of the primary image plane is 0.167. The lengths (H×VSp) of the image modulating element (the liquid crystal panel P) in the lateral direction and longitudinal direction are 13.4 mm and 7.6 mm, respectively. A central position (Chp) of the image modulation element is 5.2 mm above the optical axis O. An image circle (imc) on the side of the primary image plane is φ22.4 mm.

The lengths (H×VSs) of the screen in the lateral direction and longitudinal direction are 1,771 mm and 996 mm, respectively. A central position (Chs) of the screen size is 853 mm above the optical axis O.

As described above, the light emitted from the central pixel of the liquid crystal panel P shown in FIG. 6 corresponds to the pixel light C1 shown in FIG. 3 (denoted by the same reference symbol). The light emitted from the pixel closest to the optical axis O in the center of the liquid crystal panel P corresponds to the pixel light C2 (denoted by the same reference symbol). The light emitted from the pixel farthest from the optical axis O in the center of the liquid crystal panel P corresponds to the pixel light C3 (denoted by the same reference symbol).

The light emitted from the pixel C4 at the upper right end of the liquid crystal panel P corresponds to the light emitted from the position farthest from the optical axis O of the liquid crystal panel P (hereinafter, referred to as the pixel light C4 using the same reference symbol). In this embodiment, the pixel light C4 corresponds to the outermost incident light CE that enters the incident surface F8 at the position farthest from the optical axis O, which has been described in the conditional expression (3) and Part A of FIG. 4.

Therefore, the light beam height corresponding to the incident position of the pixel light C4 on the incident surface F8 is hmax1, and the light beam height corresponding to the emission position of the pixel light C4 is hmax2, the pixel light C4 being emitted from the emission surface F2 at the emission position.

Note that the pixel light emitted from a position different from the position farthest from the optical axis O of the liquid crystal panel P can be the outermost incident light CE in some cases. For example, the pixel light C3 or the like can be the outermost incident light CE in some cases.

FIG. 7 shows lens data of the image display apparatus. FIG. 7 shows the data for optical parts 1 to 29 (lens surfaces) disposed from the side of a first image plane (P) toward the side of a second image plane (S). As the data of each of the optical parts (lens surfaces), a radius of curvature (mm), a core thickness d (mm), and a refractive index nd in a d-line (587.56 nm), and an Abbe number vd in the d-line are described.

Further, in FIG. 7, optical parts having a positive refractive power and optical parts having a negative refractive power in the first lens system L1, which are each formed of a material different from a plastic material, are shown in a distinguishable manner. Further, the refractive index temperature coefficient dn/dt of each of these optical members is shown.

Note that in this embodiment, only the nearest lens L12 disposed in the immediate vicinity of the first reflection surface Mr1, of the first lens system L1, is formed of plastic. Then, other optical parts are formed of glass. Thus, all optical parts included in the first lens system L1 other than the nearest lens L12 are formed of a material different from plastic. It goes without saying that the present technology is not limited to such a configuration, and the optical parts other than the nearest lens L12 may be formed of plastic.

Note that the optical part having an aspherical surface follows the following formula.

$$Z = \frac{ch^2}{1 + \{1 - (1+K)c^2h^2\}^{1/2}} + \sum_{i=1}^{} A_i h^i \quad [\text{Math. 1}]$$

FIG. 8 is a table showing an example of aspherical coefficients of optical parts included in the projection optical system. FIG. 8 shows the aspherical coefficients for the optical parts 16 to 18, 20, 21, and 30 having an aspherical surface, which are marked with * in FIG. 7. The aspheric coefficients in the illustrated example correspond to the above-mentioned formula (Math. 1).

Note that in this embodiment, the formula (Math. 1) corresponds to the function Zf(h) representing the shape of the incident surface F8 (surface 16 in the data) of the nearest lens L12 corresponding to the light beam height. Further, the formula (Math. 1) corresponds to the function Zr(h) representing the shape of the emission surface F2 (surface 17 in the data) of the nearest lens L12 corresponding to the light beam height. A sag quantity Z when the light beam height h shown in Part A and Part B of FIG. 4 is input to the formula (Math. 1) is used as a parameter representing the shapes of the incident surface F8 and the emission surface F2 corresponding to the light beam height. Note that the "sag amount" represents, when a plane perpendicular to the optical axis through the plane apex is made, a distance between a plane and the point on the lens surface in the optical axis direction.

Therefore, the derivative function Z'f(h)(=dZ/dh) obtained by differentiating the function Zf(h) with the light beam height, and the derivative function Z'r(h)(=dZ/dh) obtained by differentiating the function Zf(h) with light beam height are represented by the following formula.

$$\frac{dZ}{dh} = \frac{2ch}{1 + \{1 - (1+K)c^2h^2\}^{1/2}} + \quad [\text{Math. 2}]$$

$$\frac{(1+K)c^3h^3}{\{1-(1+K)c^2h^2\}^{1/2} * [1 + \{1-(1+K)c^2h^2\}^{1/2}]^2} +$$

$$A_1 + 2A_2h + 3A_3h^2 + \ldots$$

As described above, the slope of a straight line tangent to the incident surface F8 in the light beam height h and the slope of the straight line tangent to the emission surface F2 in the light beam height h are calculated by this formula.

Note that the function representing the shapes of the incident surface F8 and the emission surface F2 is not limited, and other functions may be used. An arbitrary function capable of calculating the slope of the tangent line at an incident position farthest from the optical axis O, and the slope of the tangent line at an emission position can be used, the outermost incident light CE entering the incident surface F8 at the incident position, the outermost incident light CE being emitted from the emission surface F2 at the emission position. Then, the projection optical system only needs to be configured so that the conditional expression (3) is appropriately satisfied.

FIG. 9 is a table showing numerical values of parameters used in the above-mentioned conditional expressions (1) to (5) in this embodiment.

α1 6.30×10⁻⁶

α2 8.70×10⁻⁶

|Z'f(h max1)−Z'r(h max2)|32(31.5)

Maximum value of the refractive index temperature coefficient dn/dt of the optical part having a positive refractive power 2.5

Minimum value of the refractive index temperature coefficient dn/dt of the optical part having a positive refractive power −2.6

Maximum value of the refractive index temperature coefficient dn/dt of the optical part having a negative refractive power 1.0

Minimum value of the refractive index temperature coefficient dn/dt of the optical part having a negative refractive power 1.0

$Z'f(h\ \text{max1})$–5.0

$Z'r(h\ \text{max2})$–36.5

These results indicate that the conditional expressions (1) to (5) are satisfied.

As described above, in the image display apparatus 100 according to this embodiment, the image light refracted by the first lens system L1 is folded back and reflected by each of the first and second reflection surfaces Mr1 and Mr2. As a result, the optical path length of image light can be sufficiently secured without increasing the size of the projection optical system 30. As a result, it becomes possible to realize the miniaturization of the apparatus. Further, the linear expansion coefficient of the first optical part R11 on which the first reflection surface Mr1 is formed satisfies the conditional expression (1). This makes it possible to sufficiently suppress the influence of the environmental changes, and performance enhancement is realized.

Further, since other conditional expressions (2) to (5) are also satisfied, the effects described above can be exhibited. In addition, a highly precise image can be projected onto a screen via the second lens system L2 and the recessed reflection surface Mr3, and performance enhancement can be realized.

Second Embodiment

A projection image display apparatus according to a second embodiment of the present technology will be described. In the following description, description of the configurations and effects similar to those in the image display apparatus 100 described in the above-mentioned embodiment will be omitted or simplified.

Figure 10:
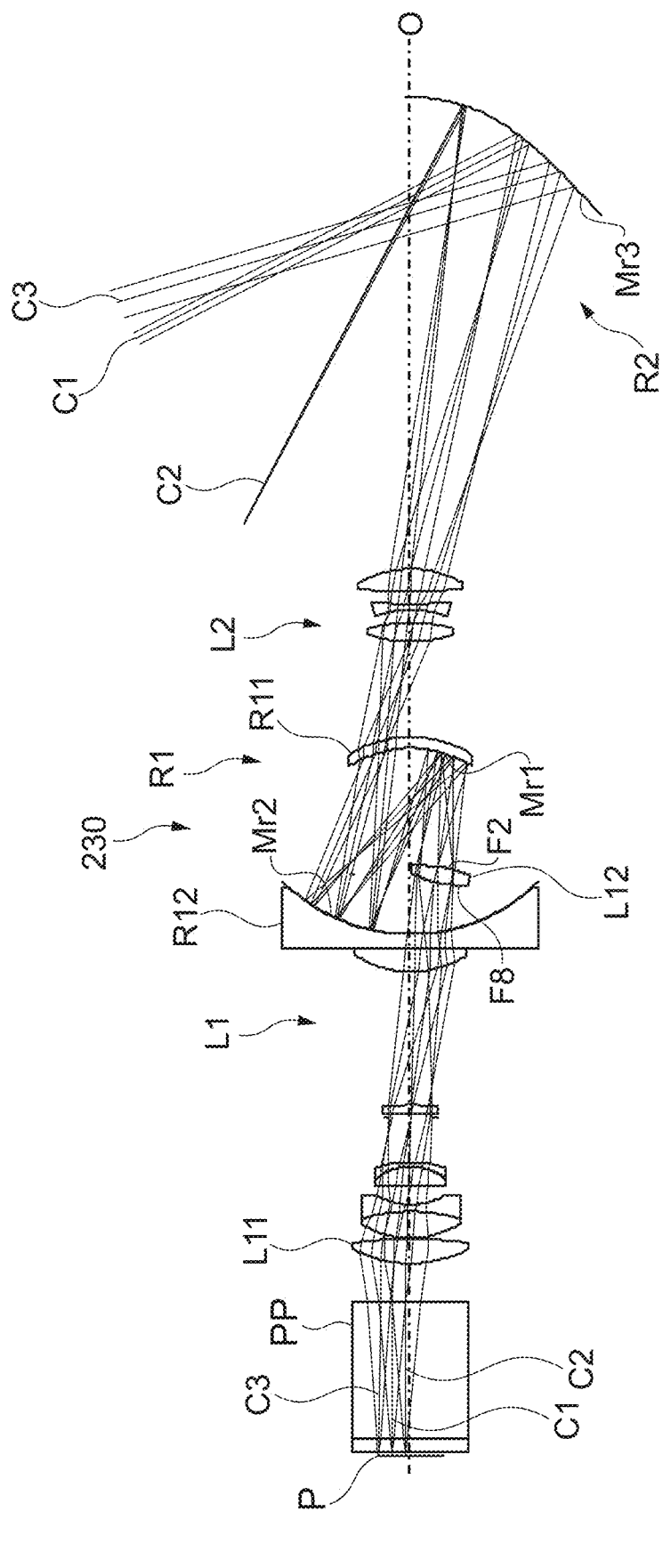
FIG. 10 is an optical path diagram showing a schematic configuration example of a projection optical system according to a second embodiment.

FIG. 10 is an optical path diagram showing a schematic configuration example of a projection optical system according to the second embodiment.

FIG. 11 shows lens data of the image display apparatus.

FIG. 12 is a table showing an example of aspheric coefficients of optical parts included in the projection optical system.

Note that the parameters relating to image projection are similar to those in the first embodiment, and are numerical values shown in FIG. 5.

Also in a projection optical system 230 according to this embodiment, the pixel light C4 emitted from the pixel C4 at the upper right end of the liquid crystal panel P corresponds to the outermost incident light CE that enters the incident surface F8 of the nearest lens L12 disposed in the immediate vicinity of the first reflection surface Mr1 at the position farthest from the optical axis O. Therefore, the light beam height corresponding to the incident position of the pixel light C4 on the incident surface F8 is hmax1, and the light beam height corresponding to the emission position of the pixel light C4 is hmax2, the pixel light C4 being emitted from the emission surface F2 at the emission position.

Further, the incident surface F8 and the emission surface F2 of the nearest lens L12 disposed in the immediate vicinity of the first reflection surface Mr1 are aspherical surfaces. Therefore, the formula (Math. 1) corresponds to the function Zf(h) representing the shape of the incident surface F8 (the surface 17 in the data) of the nearest lens L12 corresponding to the light beam height. Further, the formula (Math. 1) corresponds to the function Zr(h) representing the shape of the emission surface F2 (surface 18 in the data) of the nearest lens L12 corresponding to the light beam height.

Further, only the nearest lens L12 disposed in the immediate vicinity of the first reflection surface Mr1, of the first lens system L1, is formed of plastic. Then, other optical parts are formed of glass. Thus, all optical parts other than the nearest lens L12, of the first lens system L1, correspond to the one or more optical parts formed of a material different from plastic.

FIG. 13 is a table showing numerical values of the parameters used in the conditional expressions (1) to (5) described above in this embodiment.

$\alpha 1\ 6.30 \times 10^{-6}$ $\alpha 2\ 6.00 \times 10^{-6}$ $|Z'f(h\ \text{max1})$–$Z'r(h\ \text{max2})|19$ Maximum value of the refractive index temperature coefficient dn/dt of the optical part having a positive refractive power 2.1

Minimum value of the refractive index temperature coefficient dn/dt of the optical part having a positive refractive power –2.6

Maximum value of the refractive index temperature coefficient dn/dt of the optical part having a negative refractive power 2.4

Minimum value of the refractive index temperature coefficient dn/dt of the optical part having a negative refractive power 1.0

$Z'f(h\ \text{max1})$–5.0

$Z'r(h\ \text{max2})$–24.0

These results indicate that the conditional expressions (1) to (5) are satisfied.

Also in this embodiment, it is possible to realize miniaturization and performance enhancement of the image display apparatus similarly to the above-mentioned embodiment.

Other Embodiments

The present technology is not limited to the embodiments described above, and various other embodiments can be realized.

Figure 14:
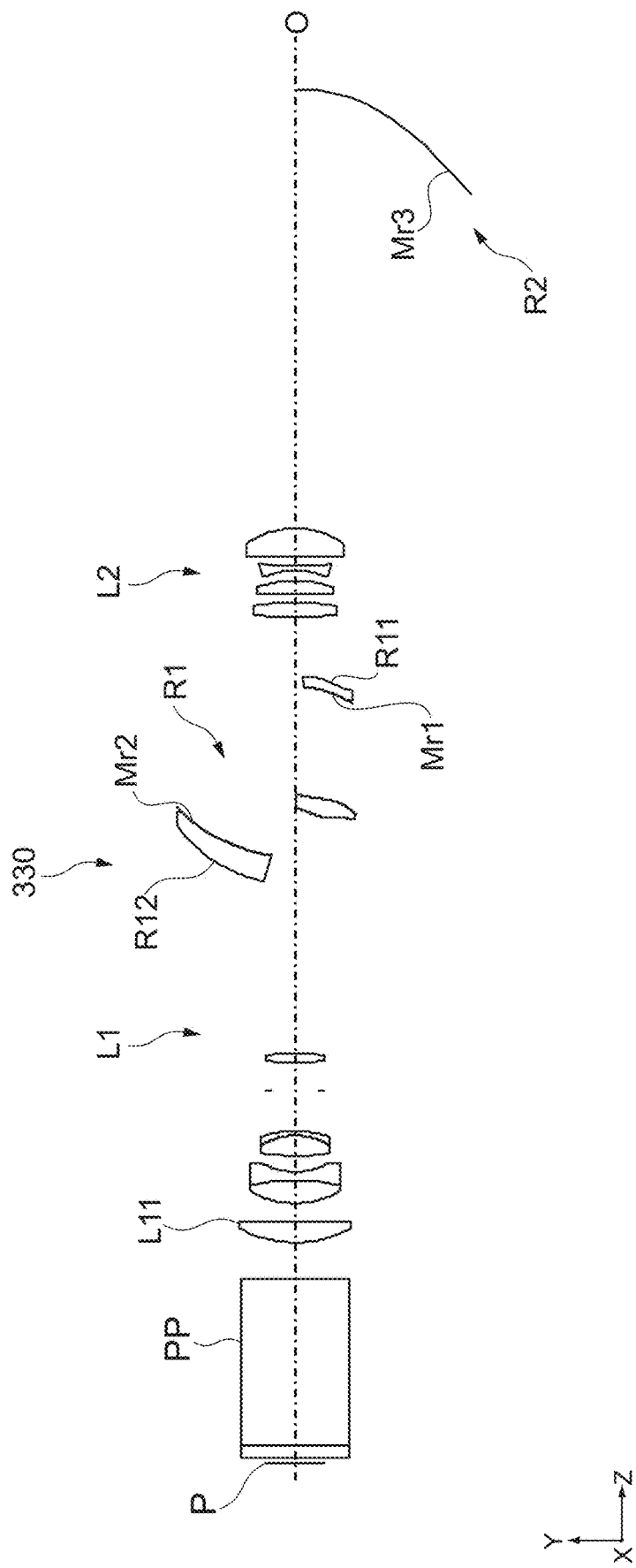
FIG. 14 is an optical path diagram showing a schematic configuration example of a projection optical system according to another embodiment.

FIG. 14 is an optical path diagram showing a schematic configuration example of a projection optical system according to another embodiment. In this projection optical system 330, only the portion where the first reflection surface Mr1 is formed is used as the first optical part R11 where the first reflection surface Mr1 is formed. Further, only the portion where the second reflection surface Mr2 is formed is used as the second optical part R12 where the second reflection surface Mr2 is formed. The present technology is applicable also in such a configuration.

Further, even in the case where at least one or any two of the first reflection surface Mr1, the second reflection surface Mr2, and the recessed reflection surface Mr3 are free-form surfaces, or at least one or any two of the first reflection surface Mr1, the second reflection surface Mr2, and the recessed reflection surface Mr3 are decentered and inclined, it is possible to realize miniaturization and performance enhancement of the apparatus by applying the present technology.

Further, in the above description, both the incident surface F8 and the emission surface F2 of the nearest lens L12 have been aspherical surfaces. The present technology is not limited thereto, and either one of the incident surface F8 and the emission surface F2 may not be an aspherical surface. For example, even in the case where the incident surface F8 and/or the emission surface F2 are spherical surfaces or free-form surfaces, or the incident surface F8 and/or the emission surface F2 are decentered and inclined, it is possible to realize miniaturization and performance enhancement of the apparatus by applying the present technology.

The number of times the main light beam C1 of image light crosses the optical axis O is not limited to four. For example, even in the case where the main light beam C1 of image light crosses the optical axis O four or more times, it is possible to achieve miniaturization and performance enhancement of the apparatus.

The number of intermediate images is not limited, and two intermediate images may be generated, or three or more intermediate images may be generated. In any case, since the optical path length is sufficiently ensured by the first and second reflection surfaces Mr1 and Mr2, it is possible to achieve miniaturization and performance enhancement of the apparatus.

The configurations of the image display apparatus, the projection optical system, the screen, and the like described with reference to the drawings are only one embodiment, and can be arbitrarily modified without departing from the essence of the present technology. In other words, for example, any other configurations or algorithms for carrying out the present technology may be adopted.

In the present disclosure, the terms "coincide", "equal", and the like are concepts including "substantially coincide" and "substantially equal". For example, the states included in a predetermined range (e.g., ±10%) based on "completely coincide", "completely equal", and the like are also included. Therefore, the concepts of "substantially coincide" and "substantially equal" are also included in the concepts of "coincide", "equal", and the like.

It is also possible to combine at least two features of the features according to the present technology described above. Specifically, various features described in each embodiment may be arbitrarily combined without distinguishing the embodiments with each other. Further, the various effects described above are not limitative but are merely illustrative, and other effects may be provided.

It should be noted that the present technology may also take the following configurations.

(1) An image display apparatus, including:
a light source;
an image generation unit that modulates light emitted from the light source to generate image light; and
a projection optical system that includes
a first lens system that has a positive refractive power as a whole and refracts the generated image light,
a first reflective optical system that has a first reflection surface and a second reflection surface, the first reflection surface folding back and reflecting the image light refracted by the first lens system, the second reflection surface folding back and reflecting the image light reflected by the first reflection surface,
a second lens system that has a positive refractive power as a whole and refracts the image light reflected by the second reflection surface, and
a second reflective optical system that has a recessed reflection surface reflecting the image light refracted by the second lens system toward an object to be projected, in which
the image display apparatus is configured to satisfy the following relationship: $5 \times 10^{-7} < \alpha 1 < 3 \times 10^{-5}$, $\alpha 1$ representing a linear expansion coefficient of a first optical part on which the first reflection surface is formed.

(2) The image display apparatus according to (1), in which
the image display apparatus is configured to satisfy the following relationship: $5 \times 10^{-7} < \alpha 2 < 3 \times 10^{-5}$, $\alpha 2$ representing a linear expansion coefficient of a second optical part on which the second reflection surface is formed.

(3) The image display apparatus according to (2), in which
at least one of the first optical part or the second optical part is formed of glass.

(4) The image display apparatus according to (2) or (3), in which
the first optical part and the second optical part are each formed of glass.

(5) The image display apparatus according to any one of (2) to (4), in which
the first optical part has one or more transparent surfaces that are formed in an area different from the first reflection surface and cause the image light to be transmitted therethrough, and
the one or more transparent surfaces of the first optical part functions as the second lens system.

(6) The image display apparatus according to any one of (2) to (5), in which
the second optical part has one or more transparent surfaces that are formed in an area different from the second reflection surface and cause the image light to be transmitted therethrough, and
the one or more transparent surfaces of the second optical part functions as the first lens system.

(7) The image display apparatus according to any one of (1) to (6), in which
the projection optical system is configured with reference to a predetermined reference axis,
the first lens system includes the nearest optical part that has an incident surface and an emission surface and is disposed at a position closest to the first reflection surface, the image light entering the incident surface, the emission surface refracting the image light that has entered from the incident surface and emitting the refracted light to the first reflection surface, and
the image display apparatus is configured to satisfy the following relationship: $1 < |Z'f(hmax1) - Z'r(hmax2)| < 45$, h representing a light beam height from the reference axis, $Z'f(h)$ representing a derivative function obtained by differentiating a function $Zf(h)$ with the light beam height, the function $Zf(h)$ representing a shape of the incident surface of the nearest optical part corresponding to the light beam height, hmax1 representing a light beam height corresponding to an incident position of outermost incident light on the incident surface, the outermost incident light entering the incident surface at a position furthest from the reference axis, hmax2 representing a light beam height corresponding to an emission position of the outermost incident light, the outermost incident light being emitted from the emission surface at the emission position.

(8) The image display apparatus according to (7), in which
the outermost incident light id light emitted from a position farthest from the reference axis of the image generation unit.

(9) The image display apparatus according to (7) or (8), in which
at least one of the incident surface or the emission surface of the nearest optical part is an aspherical surface.

(10) The image display apparatus according to any one of (7) to (9), in which
the incident surface and the emission surface of the nearest optical part are each be an aspherical surface.
(11) The image display apparatus according to (7) to (10), in which
the nearest optical part is formed of plastic.
(12) The image display apparatus according to any one of (1) to (11), in which
the image display apparatus is configured such that a refractive index temperature coefficient dn/dt of each of one or more optical parts satisfies the following relationship; −5<dn/dT<5, the one or more optical parts being included in the first lens system, formed of a material different from plastic, and having a positive refractive power.
(13) The image display apparatus according to any one of (1) to (12), in which
the image display apparatus is configured such that a refractive index temperature coefficient dn/dt of each of one or more optical parts satisfies the following relationship; −5<dn/dT<5, the one or more optical parts being included in the first lens system, formed of a material different from plastic, and having a negative refractive power.
(14) The image display apparatus according to (12) or (13), in which
the first lens system includes the nearest optical part that has an incident surface and an emission surface and is disposed at a position closest to the first reflection surface, the image light entering the incident surface, the emission surface refracting the image light that has entered from the incident surface and emitting the refracted light to the first reflection surface,
the nearest optical part is formed of plastic, and
all optical parts included in the first lens system other than the nearest optical part are each formed of a material different from plastic.
(15) The image display apparatus according to (7), in which
the reference axis is an axis obtained by extending an optical axis of a lens disposed at a position closest to the image generation unit, the lens being included in the first lens system.
(16) The image display apparatus according to (15), in which
the projection optical system is configured such that each optical axis of all of the optical parts included in the projection optical system coincides with the reference axis.
(17) The image display apparatus according to (16), in which
the recessed reflection surface is configured such that a rotational symmetry axis coincides with the reference axis, and
each of the first reflection surface and the second reflection surface is a recessed reflection surface and configured such that a rotational symmetry axis thereof coincides with the reference axis.
(18) The image display apparatus according to (1) to (17), in which
the second reflective optical system forms an image of the image light on a plane portion included in the object to be projected.
(19) A projection optical system that projects image light generated by modulating light emitted from a light source, including:
a first lens system that has a positive refractive power as a whole and refracts the generated image light;
a first reflective optical system that has a first reflection surface and a second reflection surface, the first reflection surface folding back and reflecting the image light refracted by the first lens system, the second reflection surface folding back and reflecting the image light reflected by the first reflection surface;
a second lens system that has a positive refractive power as a whole and refracts the image light reflected by the second reflection surface; and
a second reflective optical system that has a recessed reflection surface reflecting the image light refracted by the second lens system toward an object to be projected, in which
the projection optical system is configured to satisfy the following relationship: $5 \times 10^{-7} < \alpha 1 < 3 \times 10^{-5}$, $\alpha 1$ representing a linear expansion coefficient of a first optical part on which the first reflection surface is formed.

REFERENCE SIGNS LIST

F2 emission surface of nearest lens
F8 incident surface of nearest lens
L1 first lens system
L12 nearest lens
L2 second lens system
Mr1 first reflection surface
Mr2 second reflection surface
Mr3 recessed reflection surface
O optical axis (reference axis)
R1 first reflective optical system
R11 first optical part
R12 second optical part
R2 second reflective optical system
Tr1 to Tr4 transparent surface
1 liquid crystal projector
2 image
10 light source
20 lighting optical system
30, 230, 330 projection optical system
100 image display apparatus

The invention claimed is:
1. An image display apparatus, comprising:
a light source;
an image generation unit that modulates light emitted from the light source to generate image light; and
a projection optical system that includes
a first lens system that has a positive refractive power as a whole and refracts the generated image light,
a first reflective optical system that has a first reflection surface and a second reflection surface, the first reflection surface folding back and reflecting the image light refracted by the first lens system, the second reflection surface folding back and reflecting the image light reflected by the first reflection surface,
a second lens system that has a positive refractive power as a whole and refracts the image light reflected by the second reflection surface, and
a second reflective optical system that has a recessed reflection surface reflecting the image light refracted by the second lens system toward an object to be projected, wherein
the image display apparatus is configured to satisfy the following relationship: $5 \times 10^{-7} < \alpha 1 < 3 \times 10^{-5}$, $\alpha 1$ representing a linear expansion coefficient of a first optical part on which the first reflection surface is formed.

2. The image display apparatus according to claim 1, wherein
the image display apparatus is configured to satisfy the following relationship: $5\times 0^{-7}<\alpha 2<3\times 10^{-5}$, $\alpha 2$ representing a linear expansion coefficient of a second optical part on which the second reflection surface is formed.

3. The image display apparatus according to claim 2, wherein at least one of the first optical part or the second optical part is formed of glass.

4. The image display apparatus according to claim 2, wherein the first optical part and the second optical part are each formed of glass.

5. The image display apparatus according to claim 2, wherein
the first optical part has one or more transparent surfaces that are formed in an area different from the first reflection surface and cause the image light to be transmitted therethrough, and
the one or more transparent surfaces of the first optical part functions as the second lens system.

6. The image display apparatus according to claim 2, wherein
the second optical part has one or more transparent surfaces that are formed in an area different from the second reflection surface and cause the image light to be transmitted therethrough, and
the one or more transparent surfaces of the second optical part functions as the first lens system.

7. The image display apparatus according to claim 1, wherein
the projection optical system is configured with reference to a predetermined reference axis,
the first lens system includes the nearest optical part that has an incident surface and an emission surface and is disposed at a position closest to the first reflection surface, the image light entering the incident surface, the emission surface refracting the image light that has entered from the incident surface and emitting the refracted light to the first reflection surface, and
the image display apparatus is configured to satisfy the following relationship:
$1<|Z'f(hmax1)-Z'r(hmax2)|<45$, h representing a light beam height from the reference axis, $Z'f(h)$ representing a derivative function obtained by differentiating a function $Zf(h)$ with the light beam height, the function $Zf(h)$ representing a shape of the incident surface of the nearest optical part corresponding to the light beam height, hmax1 representing a light beam height corresponding to an incident position of outermost incident light on the incident surface, the outermost incident light entering the incident surface at a position furthest from the reference axis, hmax2 representing a light beam height corresponding to an emission position of the outermost incident light, the outermost incident light being emitted from the emission surface at the emission position,
wherein $Z'f(h)$ represents a derivative function obtained by differentiating a function $Zr(h)$ with the light beam height, and the function $Zf(h)$ represents a shape of the emission surface of the nearest optical part corresponding to the light beam height.

8. The image display apparatus according to claim 7, wherein
the outermost incident light emitted from a position farthest from the reference axis of the image generation unit.

9. The image display apparatus according to claim 7, wherein
at least one of the incident surface or the emission surface of the nearest optical part is an aspherical surface.

10. The image display apparatus according to claim 7, wherein
the incident surface and the emission surface of the nearest optical part are each be an aspherical surface.

11. The image display apparatus according to claim 7, wherein the nearest optical part is formed of plastic.

12. The image display apparatus according to claim 7, wherein
the reference axis is an axis obtained by extending an optical axis of a lens disposed at a position closest to the image generation unit, the lens being included in the first lens system.

13. The image display apparatus according to claim 12, wherein
the projection optical system is configured such that each optical axis of all of the optical parts included in the projection optical system coincides with the reference axis.

14. The image display apparatus according to claim 13, wherein
the recessed reflection surface is configured such that a rotational symmetry axis coincides with the reference axis, and
each of the first reflection surface and the second reflection surface is a recessed reflection surface and configured such that a rotational symmetry axis thereof coincides with the reference axis.

15. The image display apparatus according to claim 1, wherein
the image display apparatus is configured such that a refractive index temperature coefficient dn/dT of each of one or more optical parts satisfies the following relationship; $-5<dn/dT<5$, the one or more optical parts being included in the first lens system, formed of a material different from plastic, and having a positive refractive power.

16. The image display apparatus according to claim 15, wherein
the first lens system includes the nearest optical part that has an incident surface and an emission surface and is disposed at a position closest to the first reflection surface, the image light entering the incident surface, the emission surface refracting the image light that has entered from the incident surface and emitting the refracted light to the first reflection surface,
the nearest optical part is formed of plastic, and
all optical parts included in the first lens system other than the nearest optical part are each formed of a material different from plastic.

17. The image display apparatus according to claim 1, wherein
the image display apparatus is configured such that a refractive index temperature coefficient dn/dT of each of one or more optical parts satisfies the following relationship; $-5<dn/dT<5$, the one or more optical parts being included in the first lens system, formed of a material different from plastic, and having a negative refractive power.

18. The image display apparatus according to claim 1, wherein
the second reflective optical system forms an image of the image light on a plane portion included in the object to be projected.

19. A projection optical system that projects image light generated by modulating light emitted from a light source, comprising:
- a first lens system that has a positive refractive power as a whole and refracts the generated image light;
- a first reflective optical system that has a first reflection surface and a second reflection surface, the first reflection surface folding back and reflecting the image light refracted by the first lens system, the second reflection surface folding back and reflecting the image light reflected by the first reflection surface;
- a second lens system that has a positive refractive power as a whole and refracts the image light reflected by the second reflection surface; and
- a second reflective optical system that has a recessed reflection surface reflecting the image light refracted by the second lens system toward an object to be projected, wherein
- the projection optical system is configured to satisfy the following relationship: $5 \times 10^{-7} < \alpha 1 < 3 \times 10^{-5}$, $\alpha 1$ representing a linear expansion coefficient of a first optical part on which the first reflection surface is formed.

* * * * *